No. 782,782. Patented February 14, 1905.

UNITED STATES PATENT OFFICE.

RUDOLF KNIETSCH AND MAXIMILIAN SCHARFF, OF LUDWIGSHAFEN-ON-THE-RHINE, GERMANY, ASSIGNORS TO BADISCHE ANILIN UND SODA FABRIK, OF LUDWIGSHAFEN-ON-THE-RHINE, GERMANY, A CORPORATION OF BADEN.

PROCESS OF REVIVIFYING PLATINUM CONTACT SUBSTANCES.

SPECIFICATION forming part of Letters Patent No. 782,782, dated February 14, 1905.

Original application filed October 31, 1902, Serial No. 129,606. Divided and this application filed November 25, 1903. Serial No. 182,681.

*To all whom it may concern:*

Be it known that we, RUDOLF KNIETSCH, a subject of the King of Prussia, German Emperor, and MAXIMILIAN SCHARFF, a subject of the King of Saxony, both residing at Ludwigshafen-on-the-Rhine, in the Kingdom of Bavaria, Empire of Germany, have invented new and useful Improvements in Processes of Revivifying Platinum Contact Substances in the Manufacture of Sulfuric Anhydrid, of which the following is a specification.

This application was originally filed October 31, 1902, Serial No. 129,606, the present specification and claims being a division of the same pursuant to the requirement of the Patent Office.

This invention has for its object to provide improved means for effecting the revivification of platinum contact substances employed in the manufacture of sulfuric anhydrid and sulfuric acid by the catalytic process and which require to be rendered again active for reuse in the process. This effect can be obtained by passing over or through the spent contact substance at a sufficiently high temperature (for example, the temperature of the contact process) dry sulfurous-acid gas, either alone or in admixture with other gases containing no oxygen or but little oxygen, such as roaster gases containing more than the normal quantity of sulfurous-acid gas.

The employment of dry sulfurous acid has the advantage of not introducing any foreign substances into the contact-chambers or mass, and in consequence of the dryness of the gases used the apparatus is not attacked.

We claim—

1. The process for revivifying platinum contact substances employed in the manufacture of sulfuric anhydrid and sulfuric acid by treating the contact substance with dry sulfurous acid.

2. The process for revivifying platinum contact substances employed in the manufacture of sulfuric anhydrid and sulfuric acid by treating the contact substance with dry sulfurous acid in admixture with other gas containing but little oxygen.

3. The process for revivifying platinum contact substance employed in the manufacture of sulfuric anhydrid and sulfuric acid by treating the contact substance with dry roaster gases which contain more than the normal quantity of sulfurous acid.

In testimony whereof we have hereunto set our hands in the presence of two subscribing witnesses.

RUDOLF KNIETSCH.
MAXIMILIAN SCHARFF.

Witnesses:
JACOB ADRIAN,
ERNEST E. EHRHARDT.